United States Patent [19]

Skingle

[11] 3,772,681

[45] Nov. 13, 1973

[54] FREQUENCY SYNTHESISER

[75] Inventor: Gerald David Skingle, Harrow, England

[73] Assignee: The Post Office, London, England

[22] Filed: Oct. 12, 1971

[21] Appl. No.: 188,367

[30] Foreign Application Priority Data

Oct. 14, 1970 Great Britain................48864/70

[52] U.S. Cl. ............ 340/347 DA, 235/197, 328/14, 328/27

[51] Int. Cl. .......................................... H03k 13/02

[58] Field of Search............... 340/347 DA; 321/1.7; 324/85; 325/9, 13; 328/14, 16, 23, 27, 181, 185, 133; 235/154, 197; 329/110

[56] References Cited

UNITED STATES PATENTS

| | | | |
|---|---|---|---|
| 3,641,566 | 2/1972 | Konrad | 340/347 DA |
| 3,497,625 | 2/1970 | Hileman | 340/347 DA |
| 3,674,996 | 7/1972 | Yanagidaira | 235/154 |
| 3,641,565 | 2/1972 | Ivers | 235/154 |

*Primary Examiner*—Maynard R. Wilbur
*Assistant Examiner*—Jeremiah Glassman
*Attorney*—W. Scott Railton

[57] ABSTRACT

A frequency synthesiser, which may be used in Modem systems MCVFT systems and F.M. receivers, produces a predetermined waveform signal by using the digital values of incremental points on the waveform, which values are selected in a sequence determined by a address selection arrangement from a digital storage memory of the read-only type. The output from the read-only memory is a digital signal which may be filtered and distributed to a number of channels or it may be passed by way of a digital-to-analogue converter to generate the predetermined phase continuous waveform.

10 Claims, 4 Drawing Figures

FREQUENCY SYNTHESISER

Figure 1:
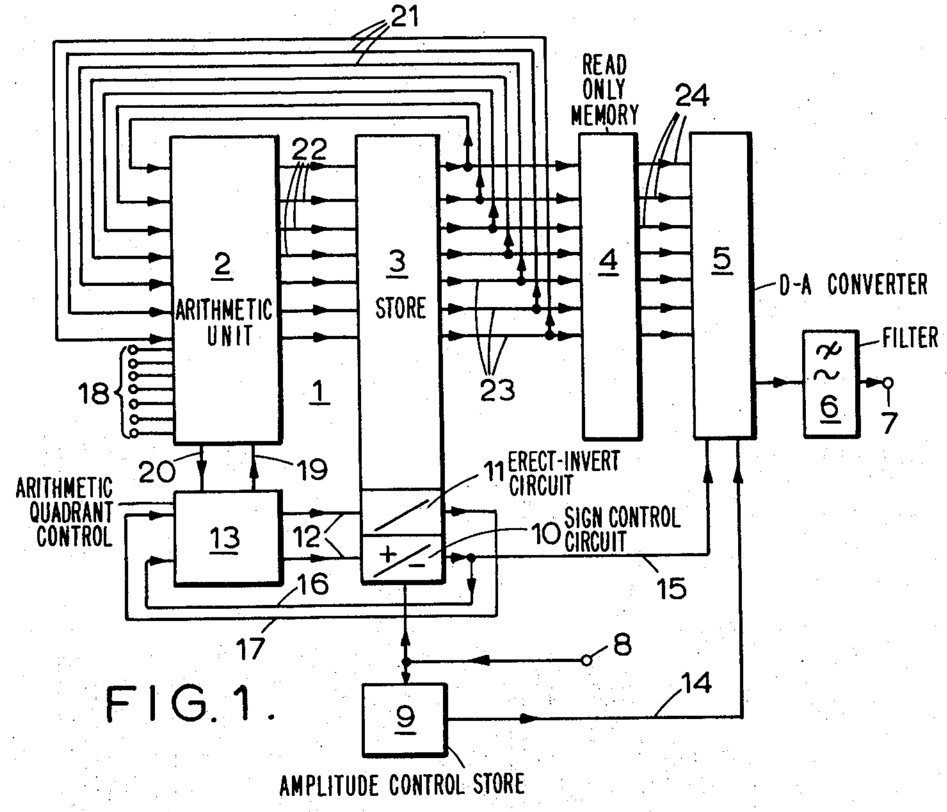

The invention relates to frequency synthesisers for producing a continuous function signal having a predetermined waveform. The invention is particularly suitable for generating sine waves or for use in data modems or MCVFT systems.

From a theoretical consideration of the synthesis of waveforms it is known that, provided the sampling rate is at least twice the highest frequency present in the waveform being sampled, then the waveform can be reconstituted by passing the sample signals in the form of amplitude modulated pulses through a low-pass filter. In the present invention this sampling theory is used to re-constitute a predetermined waveform from a succession of amplitude samples selected from a discrete number of samples stored in a memory. The memory is preferably of the read only non-destructive type which can be set with the desired range of amplitude values.

According to the present invention there is provided a frequency synthesiser for providing a continuous function signal having a predetermined waveform, said synthesiser including: a digital memory arranged to contain the amplitude values of a series of incremental points on the waveform: selection means for addressing the digital memory at a clock frequency; and digital-to-analogue converter means for producing the predetermined analogue waveform from the digital output of the memory.

The selection means is preferably an arithmetic unit and a store arranged so that the output from the store which is used to address the memory is also fed back to the arithmetic unit to progress the address to the next point on the waveform. The bit length of the store may be extended to permit the synthesiser to be used in multi-channel systems. The invention may be used in MCVFT, (multiple channel variable frequency transmission systems), data modems, fixed or selectable frequency synthesisers or electronic musical instruments in which complex waveforms have to be reproduced. If necessary the clock frequency may be variable. If the invention is used for multiple data modem operation the output from the memory of the digital to analogue converter means is applied to each data modem by way of suitable multiplex arrangement and digital to analogue converter or low-pass filter or low-pass filters respectively for each modem.

A filter to eliminate the unwanted frequency components from the output may take the form of a digital filter coupled to the output of the memory and an analogue low-pass filter to eliminate the clock pulse frequency, or an analogue low pass filter or a band pass filter connected to the output of the digital to analogue converter.

The invention may be used to produce a simple or complex waveform. To produce a symetric waveform such as a sine wave it is only necessary to store in the memory the first quadrant and to adjust the sign and direction of the address from the store. An advantage of using the present invention for MCVFT or multiple modem operation is in the reduction of the number of precision oscillators. With the invention, only one precision oscillator is required to maintain all generators on frequency and elimination of separate modulators for each channel simplifies the construction and servicing. It also provides a digital value of the waveform suitable for subsequent digital filtering without recourse to an intermediate analogue to digital converter.

In a MCVFT sytem the frequency shift can be achieved by a step in the progressing of the address. The signal change is therefore phase continuous. In a particular embodiment to be described hereinafter a MCVFT system was provided in which there was 24 channels on 120 Hertz spacing and with a frequency shift of ±30 Hertz. Because in the MCVFT system commercially available units were used rather than specially constructed units additional equipment has been introduced to act as interface units between those units essential to the invention.

Figure 2:
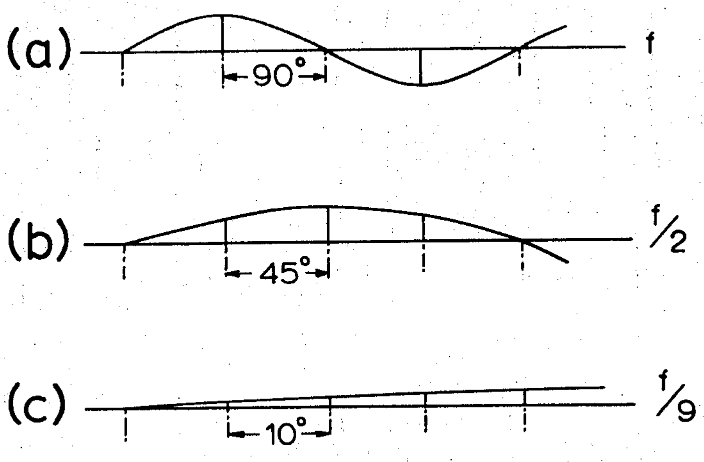
Figure 3:
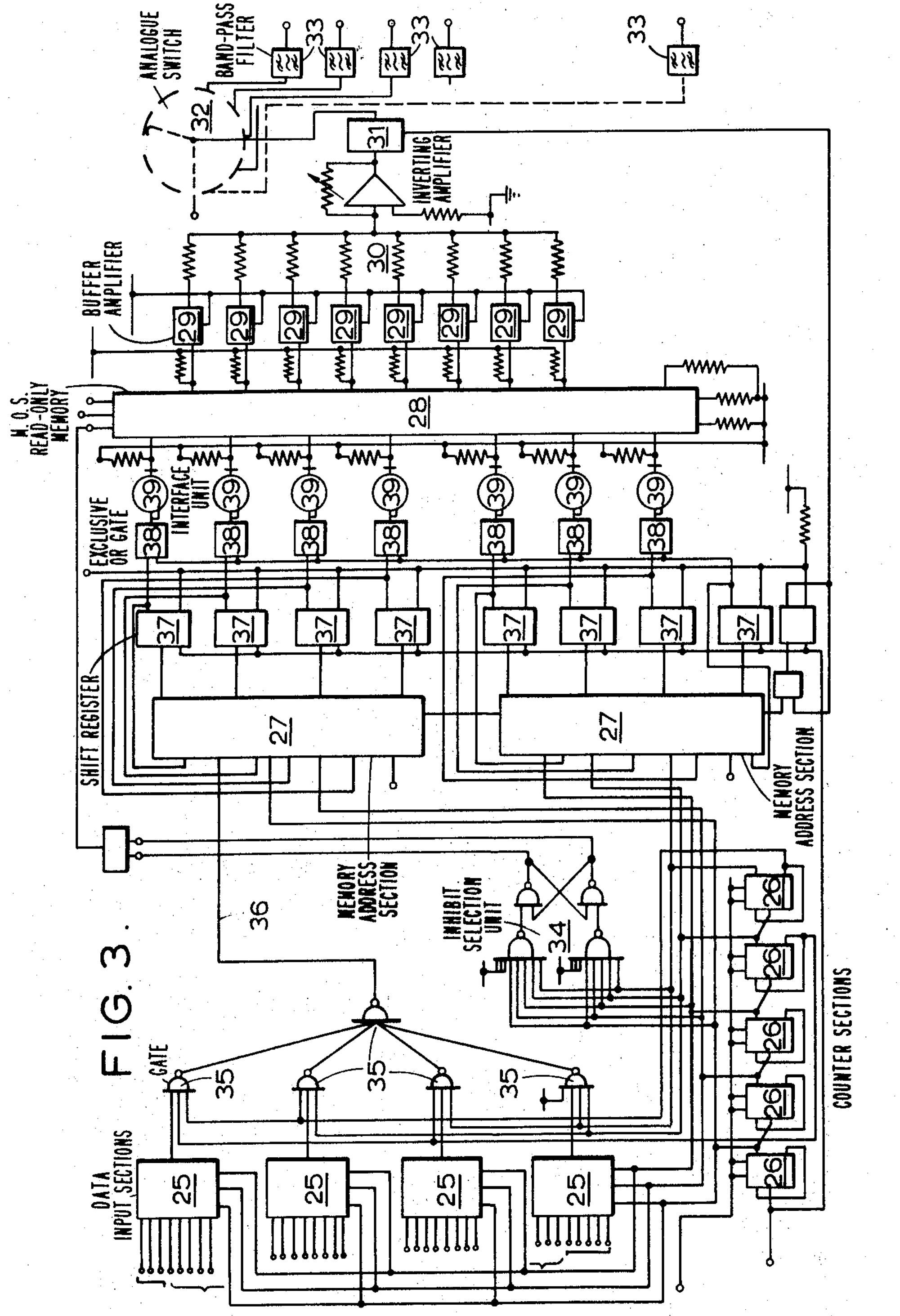
Figure 4:
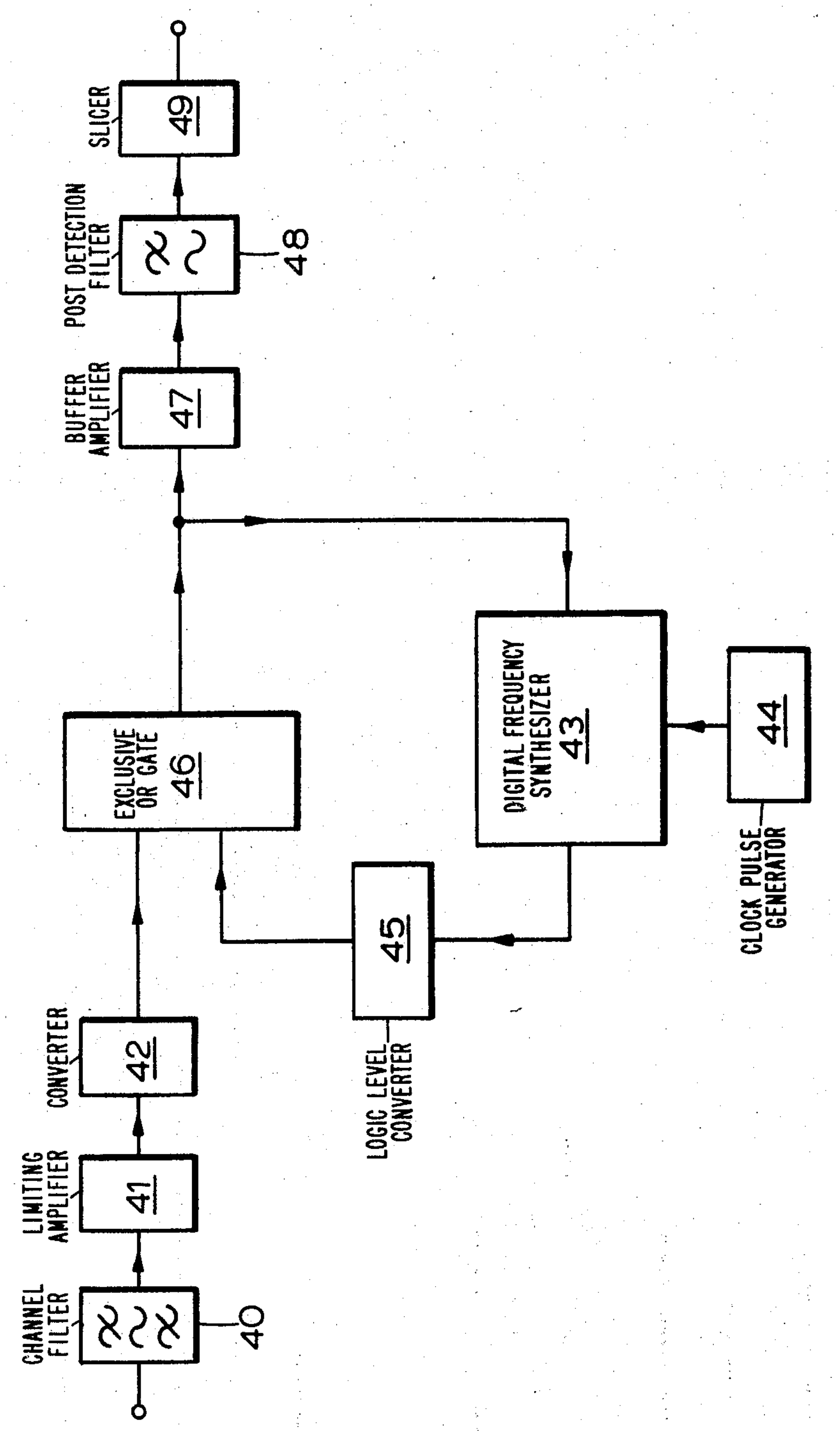

The invention will now be described, by way of example, with reference to the accompanying diagrammatic drawing in which:

FIG. 1 shows in block schematic functional terms an arrangement incorporating the principle of frequency synthesis using the invention;

FIG. 2, (*a*), (*b*) and (*c*) illustrate three possible selectable frequency sine waveforms using the arrangement of FIG. 1;

FIG. 3 shows, schematically, a possible practical realization of the invention; and FIG. 4 shows the application of a frequency synthesiser according to the invention to a frequency modulation receiver.

Referring now to the drawing, FIG. 1 basically comprises: a selection means 1; including an arithmetic unit 2 and a store 3, a read-only memory 4 addressed from the selection means; and a digital to analogue converter 5 for converting the output of the memory 4 and feeding it via filter 6 to an output terminal 7. A clock frequency generator (not shown) produces a sample clock frequency which is applied by way of a terminal 8 to an amplitude control store 9 and also to a sign control circuit 10 within the store 3. The store 3 also includes a erect/invert control circuit 11. The control circuits 10 and 11 are each supplied with signals via lines 12 from an arithmetic unit quadrant control device 13 associated with the arithmetic unit 2. The amplitude control store 9 and the circuit 10 supply signals via lines 14 and 15 respectively to the converter 5. The signals from the circuits 10 and 11 are also applied as feed-back signals to the quadrant control device 13 by way of lines 16 and 17 respectively. A number of control inputs 18 are applied to the arithmetic unit 2 which is also supplied with a signal via a line 19 from the quadrant control device 13. The control device 13 is itself supplied with a signal via a line 20 from the unit 2. Signals from the store 3 are applied over lines 21 to the unit 2 to amend the address control signals from the unit 2 to the store 3 over lines 22. The address signals from the store 3 are applied by way of lines 23 to the memory 4 so that fixed value amplitude signals are transmitted to the converter 5 over lines 24.

In operation, and referring now also to FIGS. 2a, 2b and 2c which show the shift in degrees per sample for frequencies *f*, *f*/2 and *f*/9 respectively, the function that is to be reproduced is stored in the read only memory 4, in the case of a sine wave frequency synthesis, this will be a sine look-up table. In FIG. 2*a* the shift per sample is 90°, in FIG. 2*b* the shift per sample is 45° and in FIG. 2*c* the shift per sample is 10°. These three frequencies are shown to illustrate the principle and it will be appreciated that it does not represent the only, or the range of frequencies. In the arrangement shown in FIG. 1 the output from the read only memory sine look-up table is applied by way of the lines 4 to the digital-analogue converter 5 and thence to the low pass filter 6. The input address of the read only memory 4 is derived from the store 3 which operates under control of a clock waveform, derived from the terminal 8. For a single channel application the clock frequency is equal to the sampling period. For multi-channel application, the clock frequency will be equal to the total number of channels including any not used multiplied by the sampling rate. Since the sine look-up table is only capable of providing the 0°–90° range it is simpler if the sample clock is made to be at least four times that of the highest frequency to be reproduced. This also allows the use of a less stringent filter 6 on the output of the digital to analogue converter 5.

The output from the store unit via the lines 23 and 21 provides an input to the arithmetic unit 2. A further input to unit 2 is provided by the control inputs 18. The output from the arithmetic unit 2 is then fed back into the store unit 3 as the address to be used during the next sample period.

For any frequency that it is desired to generate there must be a relationship between the sampling rate and an integer number of degrees or radians or other angular unit that the desired wave will pass through between consecutive samples, e.g. 5°. Therefore, by taking the address being presented via lines 23 to the read only memory 4 and applying this, via the lines 21, to the arithmetic unit 2 where the desired number of degrees are added to the present sample address and the output from the arithmetic unit 2 is then fed back into the store 3 for use on the next sample.

For a fixed frequency, the control inputs could also be fixed and the address for the read only memory would always advance by the same number of degrees, for each sample. If, however, it is desired to use the systems for generating the equivalent of frequency shifts, or frequency modulation such as used in MCVFT systems, or modems, then the control inputs would be selected dependent upon the data condition which is to be transmitted, i.e. to select the required frequency for the relevant input binary condition. For example, the arithmetic unit 2 may be conditioned to add ten degrees for one binary condition and twenty degrees per sample for the other binary condition. For MCVFT systems, the store 3, instead of being a single bit length store, is extended in length to a multiple bit store — for example, a 32 bit length store could be used — the samples for each channel are then time-staggered. When the output from the store 3 to address the read only memory 4 is called up for the particular channel being sampled it is arranged that its subsequent sample address is advanced by the relevant number of degrees dependent upon the data input condition of the channel, by conditioning signals to the control inputs used for that channel frequency. In a particular channel the control inputs may add 13° per sample for one binary condition and 15° for the other binary condition per sample. The output from the digital to analogue converter 5 will then be used to provide via the analogue switch the individual samples of all the channels to their filters and the output from the filters should be exactly the same as that of a normal MCVFT system.

The store 2 also contains information as to which quadrant the read only memory 4 is being addressed during the positive or negative half cycle of the wave, as well as the control condition for the arithmetic unit 2 for the selection of the erect or inverted output with the aid of circuit 11. This is also modified further if there is a carry output from the arithmetic unit 2. The modified address is stored again in the store 3 for the subsequent sample. If desired, an auxiliary amplitude control store can be provided to control any amplitude variations between channels. Alternatively, the duration of the samples may be doubled, but this only gives a coarse amplitude variation. For multiple installations of modems it may be possible to provide more economically a number of modems by using a similar system to that envisaged for the MCVFT, but also using analogue switching from the output of the digital to analogue converter to individual low pass filter or band pass for each modem. This has the advantage that only one complex piece of equipment for a number of modems is required, and only simple low pass filters are needed for each individual modem.

The main advantage of this form of waveform generation over present methods used for generating MCVFT and modem modulator output is that only one precision oscillator is required to ensure that all generators are on frequency.

By the correct choice of sample rate and number of memory words it should be possible to produce a unit which is capable of simulating any form of data modem modulation. This includes phase modulation and frequency modulation systems.

The calculated clock frequency required for a 24 channel MCVFT application with the present design is 15.360 KHz., this allows 30 Hz. frequency increments to be selected. This is because the read-only memory 4 provides 128 equal increments to cover the range 0° to 90° from the range of sine look-up table. Therefore, for a given incremental frequency, and assuming four samples per cycle the required clock frequency $C$ is equal to:

$C = f \times s \times d = 30 \times 4 \times 128 = 15.360$ KHz where $f$ = Minimum frequency increment required = 30

$s$ = Minimum number of samples per cycle = 4

$d$ = Number of divisions per 90° Sine table = 128

This then gives a maximum frequency of operation of $$15360/4 = 3840.\text{Hz.}$$

Referring now to FIG. 3, the arrangement shows in more detail one specific embodiment of the invention described in functional terms with reference to FIGS. 1 and 2. The arrangement consists of a 24 channel MCVFT system with 120 Hz. spacing and ± 30 Hz. frequency shift. The system basically comprises a data input section 25, a counter section 26, a memory address section 27, a read-only memory 28, a switched buffer amplifier stage 29 forming part of a digital-to-analogue converter 30, an inverting amplifier 31, an analogue switch 32, and a number of band pass filters 33 coupled to a common output terminal.

Because in the embodiment only 24 channels are required whereas, due to the available components and type of logic units, there is provided 32 inputs, the first 3 and the last 5 of the 32 available inputs are made ineffective. An inhibit selection unit 34, driven from the counter 26, supplies an output to the read-only memory 28 to inhibit the outputs during the eight unwanted channel states. The data input section 25 consists of four 8 channel digital multiplexers controlled from the counter 26 to provide, via gates 35, an output to a line 36 which is fed to the binary 2 input of the arithmetic unit 27. The majority of the inputs to the arithmetic unit 27 are set by the condition of the counter 26. The additional information to select the Mark or Space frequency is derived from the line 36. For example, to select channel one the counter will be in state 3, and the fourth input point will be coupled to line 36. The first and second stages of the counter will provide the binary numbers 4 and 8 respectively to the unit 27 which, together with the binary 1 which is permanently applied to the arithmetic unit 27, gives the value 13. This value selects 13×30 = 390 Hz. if the signal on the line 36 is in the 0 state, and gives 15×30 = 450 Hz., if the signal on the line 36 is in the 1 state.

The output from the arithmetic unit 27 is applied to a number of 32-bit shift registers 37. The outputs from the shift registers 37 are applied to exclusive OR gates 38 which are controlled from the store to select the erect or invert address from the store. The outputs from the exclusive OR gates 38 are then applied via suitable interface units 39 to the MOS read-only memory 28. The output from the memory 28 is applied to the digital-to-analogue converter 30 and thence by way of the inverter 31 to the analogue switch 32. The switch 32 is controlled from the counter 26 to select the addressed channel filter 33.

Referring now to FIG. 4, the F.M. receiver input is applied by way of a channel filter 40 to a limiting amplifier 41 and thence to a logic level converter 42. A digital frequency synthesiser 43, incorporating an addressed read-only memory according to the present invention and a low pass filter, is driven from a clock pulse generator 44 and supplies frequency signals by way of a logic level converter 45 to an Exclusive OR gate 46 which also receives the receiver input signals from the logic level converter 42. The output from the Exclusive OR gate 46 provides the input signal to the frequency synthesiser 43 to maintain the digital frequency synthesiser output synchronised with the received signal. The frequencies that would be generated for a continuous 1 or 0 as the input signal to the digital frequency synthesiser 43 are chosen to encompass the received range of frequencies e.g. 360 and 480 Hz. for a received range of 390 to 420 Hz. using a clock frequency of 61.44 KHz. from the clock pulse generator 44. The detected output from the Exclusive OR gate is also applied to a buffer amplifier 47 driving the output stages of a post detection filter 48 and a slicer 49.

It will be appreciated that, with the arrangement shown in FIG. 3, with the sampling addition requirements of channel 1, 13 or 15 channel 2, 17 or 19, channel 3, 21 or 23 etc, respectively for each of the channel conditions the arithmetic arrangement and hardware is simplified because only the one line 36 needs be multiplexed. If it is desired to produce frequencies requiring a less arithmetically convenient set of conditions such as sampling additions e.g. channel 1, 7 or 9 channel 2, 11–13 channel 3, 15 or 17 etc then this is possible with the addition of a further adder in the arithmetic stage before the memory address section 27. This facilitates simpler multiplexing (one line = one digit).

A further modification applicable to the system as shown in FIG. 3 may be achieved replacing the read only memory 28 by a number of comparators the number of which is equal to two less than the number of levels to be compared as the extreme levels are indicated by all the comparators being in the same condition. The output from each of the set of comparators and extreme level detectors is applied to a digital-to-analogue converter with a predetermined value resistor for each comparator and extreme level detector. With this method the number of angular increments can be expanded easily by extending the number of bits compared by the sets of comparators. The frequency resolution can therefore be improved more readily by increasing the address word length.

In a further embodiment of the invention, not shown, the read-only memory may be arranged in the feedback path to a comparator to which the input address signal is also applied. The comparator output is also applied to control the primary clock pulse to a counter which acts as the address signal source for the read-only memory and also gives the amplitude value of the sample. The computation ends before the sampling instant which is controlled at a second clock pulse frequency and it is arranged to read the amplitude value into an output buffer store at the sampling instant. The output from the buffer store provides the output signal by way of a digital-to-analogue converter as previously described.

A further alternative to this embodiment is to provide two comparators one of which comprises a first address comparison number fed directly from the read-only memory and the other comparator comprises the previously consequtive address comparison number held in a shift register store which has initially been set to zero for each sample interval of the desired waveform. The comparison of consecutive numbers continues under the control of the primary clock source as the address to the read-only memory progresses until the comparator outputs differ, at which time the read only memory address store is held until the end of the primary waveform sample interval when it is read out to the buffer store and digital-to-analogue converter. The number from the buffer store contain the amplitude information of the sample and the sign information can be included at any convenient stage. This method allows an increase in the number of frequency increments whilst maintaining the desired number of output levels and it is possible to expand the width of the read-only memory word, as mentioned earlier. If originally the system operates on 16 words of 8 bits and it is desired to double the number of frequency increments, the 16 output words and the comparator word length are increased from 8 to 9 bits between lines 7–8 to align with the new angular address length.

I claim:

1. A frequency synthesizer for providing a signal having a predetermined continuous function analogue waveform, said synthesizer comprising a source of clock frequency signals; a digital memory arranged to contain the amplitude values of a series of incremental points on the waveforms; selection means for composing an address for said digital memory and applying said address to said memory at a clock frequency derived from said clock frequency source, said selection means being arranged to compose said address from a plurality of data input signals, a first set of which is preset, and a second set of which is derived from an output of said memory; and digital to analogue converter means arranged to produce sample pulses and said converter means being coupled to a filter means to convert the series of sample pulses representing incremental points on the waveform to a continuous waveform having a predetermined selectable frequency.

2. A frequency synthesizer as claimed in claim 1 in which selection means is an arithmetic unit including a digital signal adder arranged to add a predetermined increment derived from said first set of inputs to each consecutive memory address.

3. A frequency synthesizer as claimed in claim 2 in which said digital memory is arranged to store the incremental amplitude values of a sine waveform.

4. A frequency synthesizer for providing a phase continuous function signal when switched between a number of predetermined frequencies, said synthesizer comprising: a clock frequency source; a digital read-only memory arranged to contain the amplitude values of a series of incremental points on a sine waveform; selection means for composing an address for said read-only memory and applying said address to the memory at a clock frequency obtained from the clock frequency source; data input switching means controlling the selection means so as to address the desired amplitude increment in said memory; and a memory output converter arranged to apply the selected predetermined amplitude sample to a filter.

5. A frequency synthesizer as claimed in claim 4 in which a plurality of channels are multiplexed by means of an input multiplexer driven at the clock frequency from said clock frequency source.

6. A frequency synthesizer as claimed in claim 5 in which the memory output converter signal is applied to a multiplexed digital filter.

7. A frequency synthesizer as claimed in claim 5 in which the signal from said memory output converter is fed to an output channel distributor and said signal from the memory output converter is translated to an analogue signal in a digital-to-analogue converter.

8. A frequency synthesizer for providing a continuous function signal having a predetermined waveform said synthesizer comprising: a clock frequency source; a digital memory having a multiple bit word store arranged to contain the digital amplitude values of incremental points on the waveform; selection means for composing an address for said digital memory and applying said address to the memory at a clock frequency produced from said clock frequency source; and a digital-to-analogue converter means for producing the predetermined analogue waveform from the digital output of said memory so as to generate time-staggered amplitude values for a plurality of channels.

9. A frequency synthesizer as claimed in claim 8 in which the digital memory consists of a read-only memory of sine table values.

10. A frequency synthesizer as claimed in claim 9 including a data input section and an inhibit selection unit arranged to inhibit those inputs to said data input section which are not required.

* * * * *